May 2, 1933. W. W. SIBSON ET AL 1,907,220
DRYING EQUIPMENT
Filed March 31, 1930 4 Sheets-Sheet 1
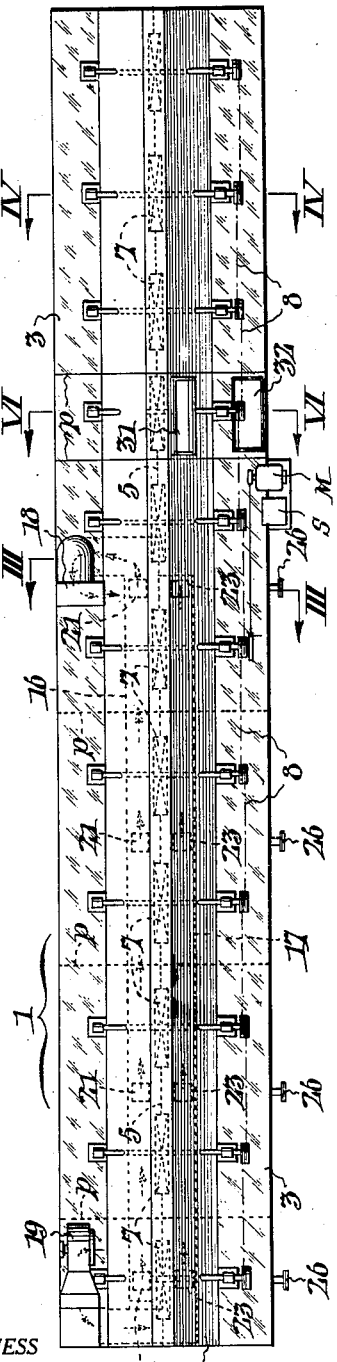
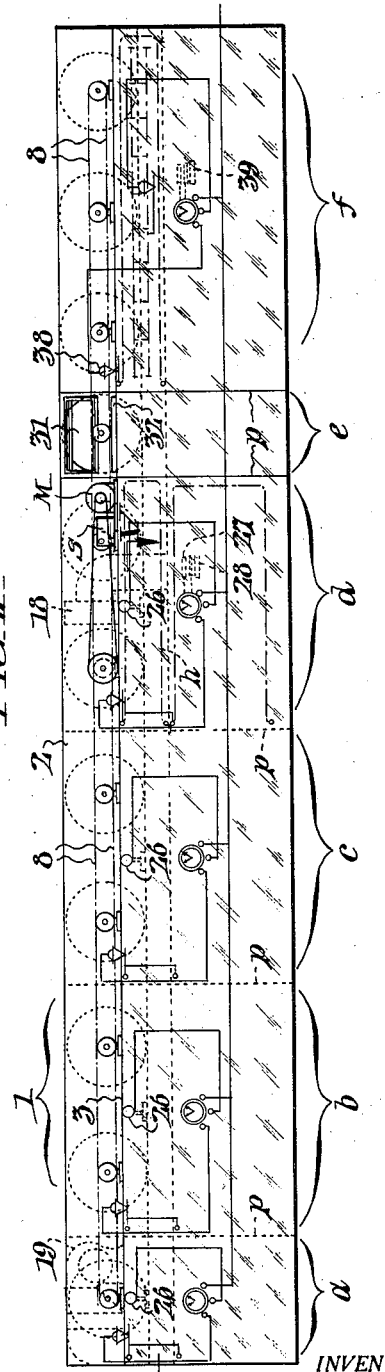
INVENTOR:
Walter W. Sibson &
Harold H. Belcher;
BY
Fraley & Paul
ATTORNEYS.

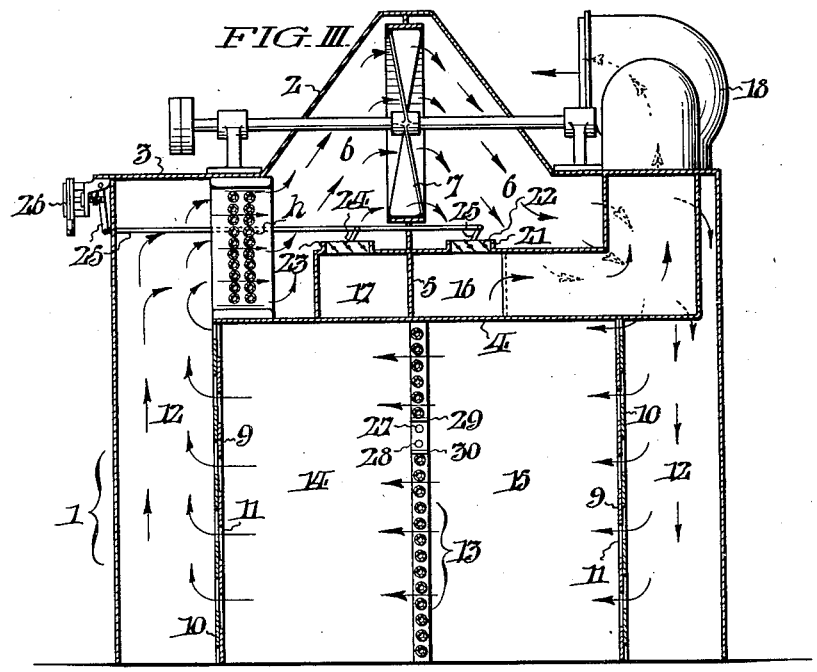
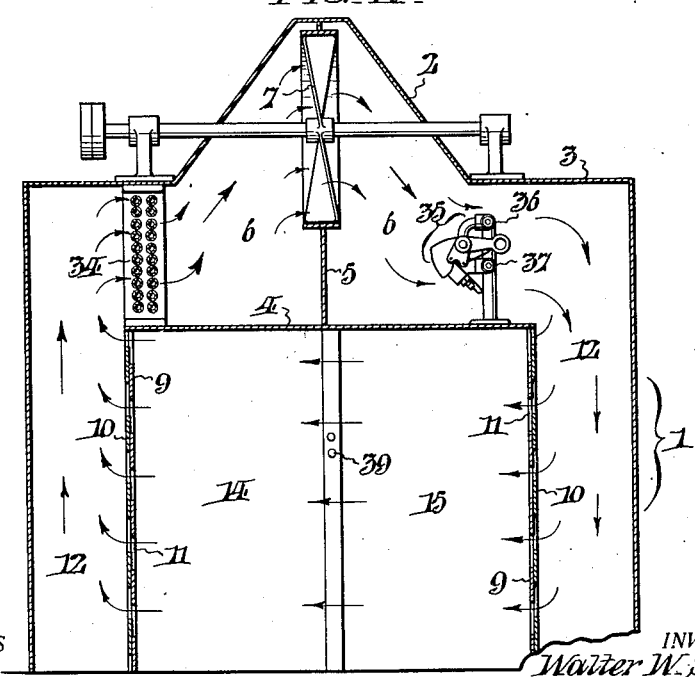

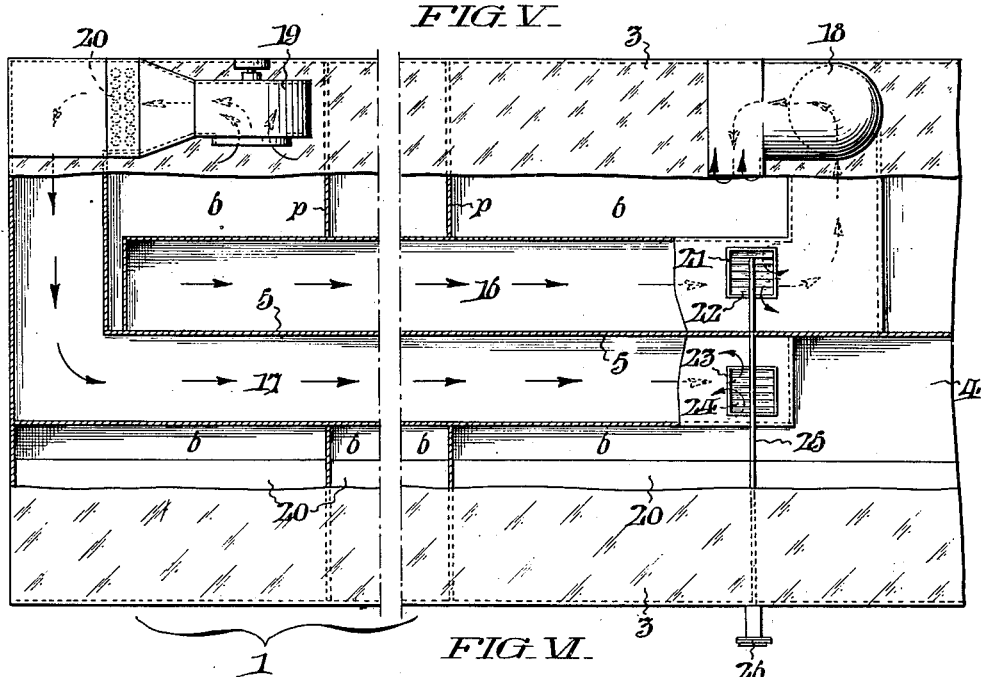
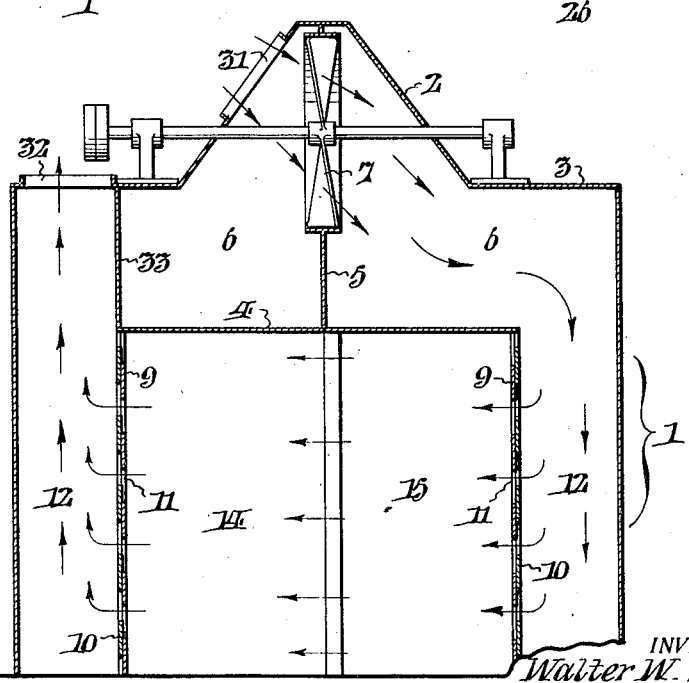

May 2, 1933.  W. W. SIBSON ET AL  1,907,220
DRYING EQUIPMENT
Filed March 31, 1930  4 Sheets-Sheet 4
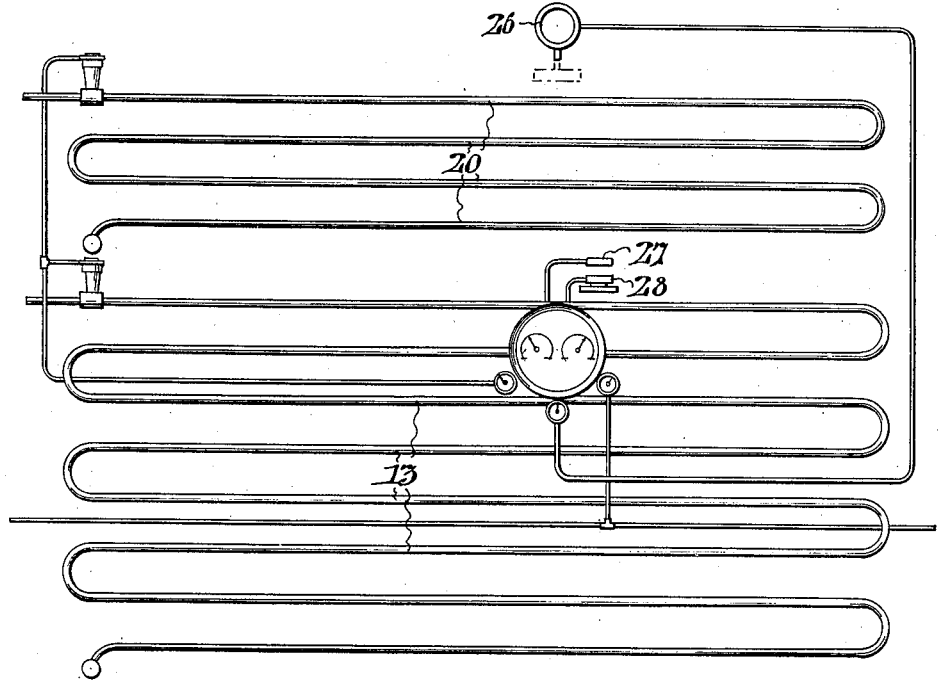
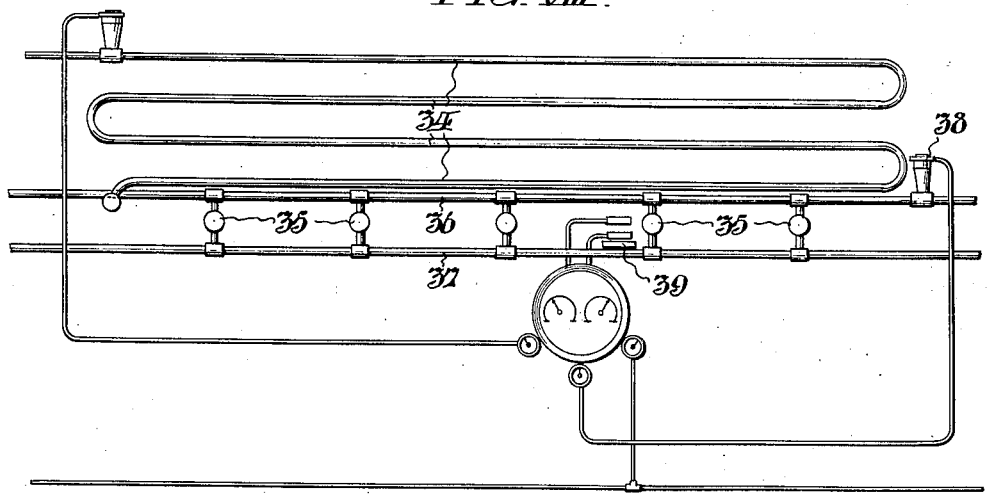
WITNESSES
John A. Weidler
George M. Muschamp
INVENTOR:
Walter W. Sibson &
Harold H. Belcher;
BY Fraley + Paul
ATTORNEYS.

Patented May 2, 1933

1,907,220

UNITED STATES PATENT OFFICE

WALTER W. SIBSON AND HAROLD H. BELCHER, OF PHILADELPHIA, PENNSYLVANIA, ASSIGNORS TO THE PHILADELPHIA DRYING MACHINERY COMPANY, OF PHILADELPHIA, PENNSYLVANIA, A CORPORATION OF PENNSYLVANIA

DRYING EQUIPMENT

Application filed March 31, 1930. Serial No. 440,311.

This invention in its broader aspects has general reference to drying equipment or material treating machines adapted to perform all the operations incident to the efficient drying or treating of different classes of goods.

More particularly, although not essentially, the present improvements relate to a novel means in which all the conditions incidental to drying materials, such as rayon, silks, cottons, and various other materials, are controllable at will, whereby the best drying conditions are readily determinable both with respect to production speed and economy, as well as regarding quality of the dried product.

In the known types of equipment for the noted purposes wherein heated air is employed as the drying medium, such medium is usually passed continuously in but one direction over the successive bobbins of rayon, or other materials. As a natural consequence the medium during passage from the leading to the terminal bobbins, or over whatever other goods is being treated, gradually decreases in its drying or conditioning capacity before there is any opportunity of it being re-heated or re-conditioned; and in cases where such medium is under a high velocity the decrease is low, while with a low velocity therefor the drop in efficiency is appreciably increased: while the greater the number of bobbins encountered, or volume of material being handled, before said medium is re-heated or re-conditioned the greater is the loss in efficiency.

The primary object of our invention is to effectively overcome the stated disadvantages by utilizing a novel circulation of air conducive to a uniform and positive treating cycle throughout all parts of the equipment, whereby the temperature drop, humidity rise, or other variables, are reduced to a very narrow margin or practically eliminated.

Another object of this invention is to provide a drying equipment characterized by flexibility of control, whereby it is made possible to maintain any reasonable temperature, and other conditions, in different zones of said equipment, without any sacrifice of the circulating medium, or the employment of complicated exterior controlling apparatus.

A further object is to provide a treating equipment capable of much greater efficiency than heretofore obtainable with analogous apparatus, both as regards drying and conditioning; which, over a period of time, averages the same for all parts of said equipment: and, thereby, incidentally, eliminates the possibility of over treating certain zones of the material before others are properly treated.

Other objects are to provide an organization of the type referred to that is simple, compact, and withal includes all the necessary features essential to successful operation.

Still further aims of the present improvements will hereinafter appear and, to such ends, our invention consists in the circulatory characteristics, structural features, combinations of elements, and arrangements of parts having the operative cycles substantially as hereinafter described, shown by the accompanying sheets of drawings, and claimed at the end of this specification.

In the drawings:

Fig. I is a top plan view of an equipment embodying the present improvements and adapted for the drying, cooling and conditioning of textile materials.

Fig. II is a diagrammatic side elevation of the same.

Fig. III is a section, on a larger scale, taken substantially on the plane designated by the arrows III—III in Fig. I.

Fig. IV is a similar section, taken as indicated by the arrows IV—IV in Fig. I.

Fig. V is a broken plan section, on a larger scale, taken approximately as indicated by the arrows V—V in Fig. II, with certain parts in elevation for purposes of clearness.

Fig. VI is a section on the plane designated VI—VI in Fig. I.

Fig. VII is a schematic view illustrative of the controls associated with the drying zone or zones of our equipment; and, Fig. VIII is a similar schematic view of the controls for the conditioning section.

In the several views corresponding parts are designated by the same characters of reference.

Referring more particularly to the drawings, we have illustrated a machine of the "tunnel truck type", but it is to be understood we are not limited thereto, as our improvements are adapted to all types of dryers having a circulation of air at right angles to the direction of material progression, with fans and heaters in the dryer housing.

The equipment shown comprises a heat insulated enclosure 1 conveniently, although not essentially, of rectangular cross-section having a longitudinal, medially located, peak 2 in the roof 3 thereof. The enclosure 1 is suitably divided by a horizontal partition 4, in the upper region thereof, with a central vertical partition or wall 5 extending the full length of said enclosure above the partition 4. The partition 4 and wall 5 jointly set apart paralleling air spaces 6, for a purpose later on explained, while said wall is apertured at intervals and fitted with appropriate housings for vertically rotative fans 7. Heater coils $h$ are conveniently located between the horizontal partition 4 and the dryer roof 3, but they may be otherwise placed if so desired.

The fans 7 are suitably co-ordinated exteriorly of the enclosure 1, for example through the medium of a belt drive 8, conventionally indicated by dot-and-dash lines in Figs. I and II, for similar directional rotation from any appropriate source of power, such as a variable speed motor M, under governance of an automatic time-controlled reversing-switch S. This switch control S may be of any conventional type including a series of electrical time relays; or it may consist of a combination of a small motor with various control switches arranged in the proper sequence and driven from the source of power M; but as such means do not form constructive features of this invention, they are merely indicated diagrammatically.

In order to ensure an even air circulation throughout all parts of the enclosure 1, that portion below the partition 4 is substantially closed in by slatted members 9, 10, one of which is adjustable relative to the other so that the extent of the openings 11 therethrough may be varied, in an obvious manner. These slatted members or partitions 9, 10 set apart flanking flow passages 12 in the enclosure 1, while the space or treating chamber closed in or tunnel formed thereby is divided by a medially located coil bank 13 to provide paralleling material treating compartments, zones, or sections 14, 15. The passages 12, 12 with the spaces 6, 6 connecting them coact as an external passage affording or defining a circulatory course for treating medium (air) through (across) the treating chamber or tunnel (from side to side); and the treating zones at opposite sides of the (reheating) coil bank 13 are in series with respect to the air flow through the treating chamber. Any appropriate hand controlled or automatic fan reverse mechanism instead of the switch S may be installed in connection with the fan drive 8, provided it is such that the air flow may be circulated across the compartments 14, 15 for a certain period of time first in one direction and then in the other, by the motor M being adapted to run in one direction for a predetermined time, automatically stop to allow the fans 7 to come to rest, re-start in a reverse direction for a similar period of time, again stop, and re-start in the original direction to repeat the cycle. In this way an average condition, both as to temperature and humidity, is maintainable over a period of time in all sections of the enclosure 1. Thus it will be readily understood that, when the circulation of air is in one direction across a treating section 14 or 15 the temperature thereof will drop, due to evaporation or heating of the material being treated. In other words, the temperature at either inlet side or slats 9, 10 of the respective treating sections 14, 15, is considerably higher than the temperature at the exit side; and to obviate such disadvantage we install the hereinbefore mentioned heater coil or coils 13, which serve to re-heat the air passing from one section 14, to the other 15, to approximately the same temperature as that at which it enters by way of either system of adjustable slats 9, 10, according to the directional flow. In this way we are enabled to effect a gradual temperature drop in each of the treating sections 14, 15, with a corresponding temperature regain by aid of the re-heater coils 13. Now, when the direction of air flow or circulation is reversed, there will be a similar temperature drop in an opposite direction, so that over a period of time, average conditions can be maintained; whereby a distinctive improvement over conventional designs of dryers is established in which the exit side of the drying compartments always shows a markedly slower drying capacity than that which obtains at the entrance side.

To remove moisture from the enclosure 1 we install a special system comprising an exhaust duct 16 longitudinally above the partition 4 along one side of the vertical wall 5; and a supply duct 17 similarly located at the other side of said wall. The exhaust duct or conduit 16 connects with an exhaust blower 18 on the roof 3 of the enclosure 1; while fresh air is forced through the supply duct 17 by a similarly located suction blower 19. The suction blower 19 takes fresh exterior air from the building in which the dryer enclosure 1 is located, or from the atmosphere outside the same, and forces it through preheater coils 20 into the supply duct 17; whereby the temperature of the entering air is regulated and controlled by the medium circulating through said coils.

In the particular dryer illustrated the same is transversely divided by vertical cross partitions $p$ to set apart a succession of drying sections $a$, $b$, $c$, and $d$; a cooling section $e$; and a conditioning section $f$; all as easily appreciated from Figs. I and II, more particularly.

Exhaust of moisture laden air from the successive drying sections $a$—$d$ is effected by way of outlets 21, in the top wall of the duct or conduit 16, each fitted with a damper device 22; while a corresponding quantity of fresh air is concurrently admitted to the respective sections through similar inlets 23 having dampers 24 in the top wall of the supply duct or conduit 17. These controllable air supply and exhaust openings 21, 23 open at opposite sides of the fans 7 into the spaces 6, 6 of the flow passage that extends at 12, 12 to opposite sides of the treating chamber or tunnel, as above described. The dampers 22, 24 of each section $a$—$d$ are interconnected, as by a linkage 25, for simultaneous actuation, so as to present equal "openings" at all times, or be concurrently closed; while said linkages are respectively co-ordinated with an associated wet-bulb controlled diaphragm motor 26 in accordance with known practice. Thus it will be readily understood that the position of the dampers 22, 24 for each section $a$—$d$ is automatically controlled by the wet bulb temperature of the air circulating the respectively associated treating compartments 14, 15 in such a way that when the wet bulb temperature falls below a predetermined set degree, said dampers automatically close and thereby permit the humidity to build up and thus raise the wet bulb temperature.

The just described type of exhaust control system embodies two features which are materially different from known systems, wherein the wet bulb temperature of the air rises from the point of admission of fresh air to a maximum at the point of exhaust of saturated air. Firstly, as the fresh air inlet is ordinarily located near the delivery end of conventional dryers with the exhaust placed proximate or at the feeding-in end, such dryers can only maintain conditions in which the wet bulb temperature has a gradual increase from the delivery to the feed ends. Now, in accordance with our novel system the wet bulb temperature of each section $a$—$d$ is entirely independent of that obtaining in the others, while there is a corresponding increase in flexibility of control which is especially valuable for experimental purposes in determining the most desirable drying conditions from the standpoint of quality in the finished product. Secondly, the conditions within each section $a$—$d$ are practically independent of the rate of charging material into the enclosure 1. In known types of such dryers, if the material to be dried is fed in at a speed faster than standard, the volume of exhaust air remains constant while the humidity will be higher than desirable; and contrariwise if the charging rate is slower than standard the humidity will be correspondingly lower. Hence, when such dryers are operated under an irregular schedule such as when starting-up after a shut-down, or when the last material charged before a shut-down, there is considerable likelihood that some of the material will be over dried, consequent upon too low a degree of humidity existing within the dryer.

In accordance with our invention the dry bulb temperature may be controlled by any of the standard control methods operative through the medium of suitable valves on the steam coils. The operating dry bulbs 27 as well as the wet bulb 28, are accordingly, located preferably on the center line of the reheater coil bank 13, with heat-insulating baffle plates 29, 30 above and below the same to protect said bulbs from direct radiation influence by the coil bank 13. However, these temperature and humidity responsive control devices 27, 28, are in the path of movement of the treating medium, and subject to influence by its temperature and humidity conditions, there between the treating zones, to vary the controllable openings at 21, 23.

Referring now to the cooling section $e$, as best understood from Fig. VI, it will be seen the same is devoid of heater coils 13 and temperature controls; while the fan 7 therein draws in cool air by way of an inlet 31, in the peak 2 at one side of the wall 5, and circulates the same through the space 6, flanking flow passages 12, material treating sections 15, 14, to a discharge outlet 32 in the flat roof 3; or counter-directionally when the fan 7 is reversed. To ensure such circulation of the fresh air a vertical partition 33 extends longitudinally of the cooling section $e$, intermediate the horizontal partition 4 and the flat roof 3, thus cutting-off re-circulation of air to the fan 7.

The conditioning section $f$, shown to best advantage in Fig. IV, it will be noted, does not include a dividing partition 33, but in lieu thereof we install a heater coil 34 extending longitudinally of said section. In addition we locate in the section $f$ a succession of appropriate air moisteners or spray devices 35, the same being conveniently mounted on the partition 4, as shown. These spray devices 35 are of any conventional type, suitable to the purpose, and they are interposed in common air and water lines 36, 37, respectively; in the former of which is fitted a diaphragm valve 38, Fig. II and VIII, under control of a wet bulb 39 preferably located in the center line dividing the treating compartments 14, 15 of the conditioning section f. Obviously the tunnel enclosure 1 is, or may be, provided with end doors, not shown, in accordance with known practice.

From the foregoing it is thought the operation of our novel dryer, as well as the process involved thereby, will be clearly apparent without further elaboration herein; but it is desired to particularly emphasize the fact that by utilizing a strong circulation of air we are enabled to obtain a uniform and positive circulation throughout all sections a—f of the tunnel enclosure 1, with a consequent keeping of the temperature drop and humidity rise down to a very narrow variable. Again, in general, known forms of similar dryers wherein the air circulates constantly in one direction evidence a temperature drop of as much as 20 to 30 degrees Fahrenheit; whereas by our system of reversing the circulation we reduce such variation to but a few degrees, and frequently without any visible change. The flexibility of our novel system of temperature and humidity controls renders the novel machine highly efficient for experimental purposes in predetermining the most favorable treating conditions for differing classes of goods. The special exhaust and fresh air supply controls 22, 24, respectively, make the dryer portion in effect a succession of practically independent units a—d, each of which can be separately controlled, both as to temperature and humidity conditions prevailing therein; while such controls render the machine absolutely unaffected by changing exterior weather or atmospheric variations.

Finally, it is to be understood that some features of our invention may be used without others, or said invention likewise be embodied in widely differing forms of material treating machines; therefore, without limiting the same to the construction shown and specifically described, nor enumerating equivalents, we reserve the right to all such other adaptations and modifications as are encompassed by reasonable interpretation of the following claims.

Having thus described our invention, we claim:

1. A material treating equipment of the character described comprising a treating chamber; a flow passage external to said chamber defining a circulatory course for treating medium through said chamber; heater means and a rotary fan in said flow passage; reheater means in said treating chamber dividing the same into a plurality of treating zones in series with respect to the flow of treating medium through said chamber; controllable openings into the flow passage for the supply and exhaust of treating medium; means for automatically varying said controllable openings, including control means adjacent said reheater means, between said zones and in the path of movement of the treating medium, subject to influence by the temperature and humidity conditions of the treating medium; and means for periodically reversing the direction of treating medium circulation within the equipment.

2. A material treating equipment as claimed in claim 1 including temperature and humidity control devices operatively coordinated with means for injecting moisture into the circulatory medium.

3. A material treating equipment as claimed in claim 1, wherein the treating chamber and flow passages are divided by vertical cross partitions which set apart therein a succession of individually controlled substantially independent drying sections.

4. A material treating equipment as claimed in claim 1, wherein the treating chamber and flow passages are divided by vertical cross partitions which set apart therein a succession of individually controlled substantially independent drying sections, with means for automatically and simultaneously reversing the direction of drying medium circulation in all said drying sections.

5. A material treating equipment of the character described comprising a treating tunnel; a flow passage external to and extending to opposite sides of said tunnel defining a circulatory course for treating medium across said tunnel from side to side; heater means and a rotary fan in said flow passage; reheater means in said tunnel dividing the same into a plurality of treating zones in series with respect to the flow of treating medium across said tunnel; controllable openings into the flow passage for the supply and exhaust of treating medium; means for automatically varying said controllable openings, including control means adjacent said reheater means, between said zones and in the path of movement of the treating medium, subject to influence by the temperature and humidity conditions of the treating medium; and means for periodically reversing the direction of treating medium circulation within the equipment.

6. A material treating equipment of the character described comprising a treating chamber; a flow passage external to said chamber defining a circulatory course for treating medium through said chamber; heater means and a rotary fan in said flow passage; reheater means in said treating chamber dividing the same into a plurality of treating zones in series with respect to the flow of treating medium through said chamber; controllable openings into the flow passage for the supply and exhaust of treating medium; means for automatically varying said controllable openings and the supply of heating medium to said heater and reheater means, including humidity and temperature control devices adjacent said reheater means, between said zones and in the path of movement of the treating medium, subject to influence by the humidity and temperature conditions of the treating medium, the humidity control device to automatically vary the said controllable openings and the temperature control device to control the supply of heating medium to said heater and reheater means, to control the temperature in the treating zones; and means for periodically reversing the direction of treating medium circulation within the equipment.

7. A material treating equipment of the character described, comprising a treating tunnel; a flow passage external to said tunnel defining a circulatory course for treating medium through said tunnel; heater means and a rotary fan in said flow passage; reheater means in said tunnel dividing the same into a plurality of treating zones in series with respect to the flow of treating medium through said tunnel; controllable supply and exhaust openings into said circulatory course at opposite sides of said fan; means for automatically varying said controllable openings and the supply of heating medium to said heater and reheater means, including humidity and temperature control devices adjacent said reheater means, between said zones and in the path of movement of the treating medium, subject to influence by the humidity and temperature conditions of the treating medium, the humidity control device to vary the said controllable openings and the temperature control device to control the supply of heating medium to said heater and reheater; means for protecting both of said control devices from direct influence by said reheater; and means for periodically reversing the direction of treating medium circulation.

8. An equipment of the character described comprising a treating tunnel divided to form successive drying, cooling, and conditioning sections; flow passages external to said tunnel defining circulatory courses for treating media through the respective sections; rotary fans in the said flow passages; heater means in the flow passages of the drying and conditioning sections; reheater means in the drying and conditioning sections of the tunnel dividing each of them into a plurality of treating zones in series with respect to the flow of treating media through said drying and conditioning sections; controllable supply and exhaust openings into the flow passages; means for automatically varying said controllable openings, including control means adjacent said reheater means in said sections, between their treating zones and in the paths of movement of the treating media, subject to the temperature and humidity conditions of the treating media; and means for periodically reversing the direction of circulation of treating media in the treating sections.

9. An equipment of the character described comprising a treating tunnel, with opposite walls of relatively adjustable slats, divided to form successive drying, cooling, and conditioning sections; flow passages external to said tunnel defining circulatory courses for treating media through the slatted tunnel walls and across the respective tunnel sections; rotary fans in the said flow passages; heater means in the flow passages of the drying and conditioning sections; reheater means in the drying and conditioning sections of the tunnel dividing each of them into a plurality of treating zones in series with respect to the flow of treating media across said drying and conditioning sections; controllable supply and exhaust openings into the drying-section flow passages; inlet and outlet openings into the cooling-section flow passages, for the circulation of fresh treating medium through the cooling section; means for automatically varying said controllable openings into the drying sections, including control means adjacent said reheater means in the drying sections, between their treating zones and in the paths of movement of the treating media, subject to the temperature and humidity conditions of the treating media; and means for periodically reversing the directions of circulation of treating media in the drying, cooling, and conditioning sections.

In testimony whereof, we have hereunto signed our names at Philadelphia, Pennsylvania, this 26th day of March, 1930.

WALTER W. SIBSON.
HAROLD H. BELCHER.